(12) United States Patent
Chae et al.

(10) Patent No.: US 12,288,498 B2
(45) Date of Patent: Apr. 29, 2025

(54) DISPLAY DEVICE

(71) Applicant: LG DISPLAY CO., LTD., Seoul (KR)

(72) Inventors: Jaekwon Chae, Paju-si (KR); Byungwoong Kim, Paju-si (KR)

(73) Assignee: LG Display Co., Ltd. (KR)

(*) Notice: Subject to any disclaimer, the term of this patent is extended or adjusted under 35 U.S.C. 154(b) by 0 days.

(21) Appl. No.: 18/217,085

(22) Filed: Jun. 30, 2023

(65) Prior Publication Data
US 2024/0013695 A1    Jan. 11, 2024

(30) Foreign Application Priority Data
Jul. 6, 2022  (KR) .......................... 10-2022-0083345

(51) Int. Cl.
*G09G 3/20*    (2006.01)

(52) U.S. Cl.
CPC ... *G09G 3/2003* (2013.01); *G09G 2300/0421* (2013.01); *G09G 2310/027* (2013.01); *G09G 2310/0289* (2013.01); *G09G 2310/0297* (2013.01); *G09G 2310/08* (2013.01); *G09G 2320/0693* (2013.01)

(58) Field of Classification Search
CPC ..... G09G 2300/0421; G09G 2310/027; G09G 2310/0289; G09G 2310/0297; G09G 2310/08; G09G 2320/0693; G09G 3/2003
See application file for complete search history.

(56) References Cited

U.S. PATENT DOCUMENTS

| | | | |
|---|---|---|---|
| 2015/0091862 A1* | 4/2015 | Bertrand | G06F 3/0446 345/174 |
| 2019/0102015 A1* | 4/2019 | Kim | H10K 50/82 |
| 2024/0257779 A1* | 8/2024 | Kim | G06F 3/0446 |

FOREIGN PATENT DOCUMENTS

KR    10-2021-0036689 A    4/2021

* cited by examiner

*Primary Examiner* — Kenneth Bukowski
(74) *Attorney, Agent, or Firm* — Fish & Richardson P.C.

(57) ABSTRACT

A display device includes a display panel including pixels which display images; a display panel driving circuit which outputs a drive signal for driving the display panel; and a compensation signal generator which senses a noise signal generated by the display panel or the display panel driving circuit and generates a noise compensation signal corresponding to the noise signal. The compensation signal generator includes: a detection unit which detects a phase shift signal generated by synthesizing target signals; and an inversion unit which generates a phase inversion signal by inverting a phase of the phase shift signal.

14 Claims, 15 Drawing Sheets

DISPLAY DEVICE

CROSS-REFERENCE TO RELATED APPLICATION

The present application claims priority to KR Patent Application No. 10-2022-0083345, filed on Jul. 6, 2022, which is hereby incorporated by reference in its entirety.

BACKGROUND

Field of the Disclosure

The present disclosure relates to a display device.

Description of the Background

A display device includes a liquid crystal display, an electroluminescent display device, etc. The electroluminescent display device may be divided into an inorganic light emitting display device and an organic light emitting diode display device according to the material of a light emitting layer.

As the resolution of the display device gradually increases, higher frequencies and more signals are required to drive the display device, resulting in signal distortion and electromagnetic interference (EMI) noise.

To solve the problems, a phase cancellation method which uses a phase inversion signal having the same amplitude as and an opposite polarity to a target signal (e.g., an electromagnetic wave signal) as a noise compensation signal is applied. However, since there occurs a delay between the target signal and the phase inversion signal in a general phase cancellation method, there is a problem that the phase cannot be completely canceled. In particular, the noise improvement effect is significantly reduced in a high frequency domain, which causes a problem.

SUMMARY

Accordingly, the present disclosure is directed to a display device that substantially obviates one or more of problems due to limitations and disadvantages described above.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

More specifically, the present disclosure is to provide a display device which has improved noise such as EMI within a display panel.

The present disclosure is also to provide a display device which implements zero delay of a noise compensation signal by using a phase shift signal extracted by synthesizing target signals.

To achieve these and other advantages and in accordance with the present disclosure, as embodied and broadly described, a display device includes: a display panel including pixels which display images; a display panel driving circuit which outputs a drive signal for driving the display panel; and a compensation signal generator which senses a noise signal generated by the display panel or the display panel driving circuit and generates a noise compensation signal corresponding to the noise signal. The compensation signal generator may include: a detection unit which detects a phase shift signal generated by synthesizing target signals; and an inversion unit which generates a phase inversion signal by inverting a phase of the phase shift signal.

The target signal may include: a first signal which is sensed from the display panel through a sensing line; and a second signal is generated by inverting a phase of the first signal. The detection unit may detect the phase shift signal generated by synthesizing the first signal and the second signal. The second signal may have a phase shift component with respect to a phase inversion signal of the noise signal.

The phase inversion signal output from the inversion unit may be synthesized with the second signal to generate the noise compensation signal, and the noise compensation signal may be provided to the display panel.

The noise compensation signal may have the same frequency and the same amplitude as the noise signal and may have an upside-down inverted phase with respect to the noise signal.

The compensation signal generator may further include an amplification unit which amplifies or attenuates the phase inversion signal output from the inversion unit.

The display panel may include touch electrodes for detecting a touch input. The display panel driving circuit may apply a common voltage to the touch electrode during a display period, and may apply a touch drive signal to the touch electrode during a touch sensing period.

The first signal may be an electromagnetic interference (EMI) noise signal which is sensed from the display panel when the touch drive signal of pulse shape is applied to the touch electrodes.

The display device may further include a level shifter which sequentially outputs a plurality of clock signals to clock lines. The detection unit may detect the phase shift signal generated by synthesizing the plurality of clock signals.

The phase inversion signal output from the inversion unit may be provided to the display panel as the noise compensation signal, and may be synthesized with the noise signal generated by the plurality of clock signals, so that a phase of the noise signal can be canceled.

The plurality of clock signals may be n number of pulse signals which have the same pulse width and have a phase delayed by 1/n cycle.

A rising edge and a falling edge between adjacent clock signals among the plurality of clock signals may be delayed or advanced with respect to each other with a random time.

The display panel driving circuit may include: a gate driver which applies a gate signal to the pixels through gate lines; a data driver which applies a data signal to the pixels through data lines; and a demultiplexer array which disposed between the data driver and the data lines. The clock signals are provided to at least one of the gate driver and the demultiplexer array.

Another aspect is a display device including: a display panel which includes pixels and touch electrodes formed by blocking electrodes of the pixels to a predetermined size; a touch driver which applies a drive signal to the touch electrodes during a touch sensing period and detects a touch input based on a sensing signal received in response to the drive signal; and a compensation signal generator which senses a noise signal generated by the display panel and generates a noise compensation signal corresponding to the noise signal. The compensation signal generator may include: a detection unit which detects a phase shift signal generated by synthesizing the sensed noise signal and a first phase inversion signal which is a phase inversion signal of the sensed noise signal; and an inversion unit which generates a second phase inversion signal by inverting a phase of the phase shift signal.

The detection unit may senses the noise signal from the display panel through a sensing line.

The first phase inversion signal may have a phase shift component with respect to a phase inversion signal of the noise signal generated by the display panel.

The second phase inversion signal output from the inversion unit may be synthesized with the first phase inversion signal to generate the noise compensation signal, and the noise compensation signal may be output to the display panel.

Further another aspect is a display device including: a display panel on which pixels are disposed; a level shifter which sequentially outputs a plurality of clock signals to clock lines; a gate driver which generates a gate signal based on the plurality of clock signals and applies the gate signal to the pixels through gate lines; a data driver which applies a data signal to the pixels through data lines; and a compensation signal generator which senses a noise signal generated by the level shifter and generates a noise compensation signal corresponding to the noise signal. The compensation signal generator may include: a detection unit which detects a phase shift signal generated by synthesizing the plurality of clock signals; and an inversion unit which generates a phase inversion signal by inverting a phase of the phase shift signal.

The plurality of clock signals may be n number of pulse signals which have the same pulse width and have a phase delayed by 1/n cycle.

A rising edge and a falling edge between adjacent clock signals among the plurality of clock signals are delayed or advanced with respect to each other with a random time.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
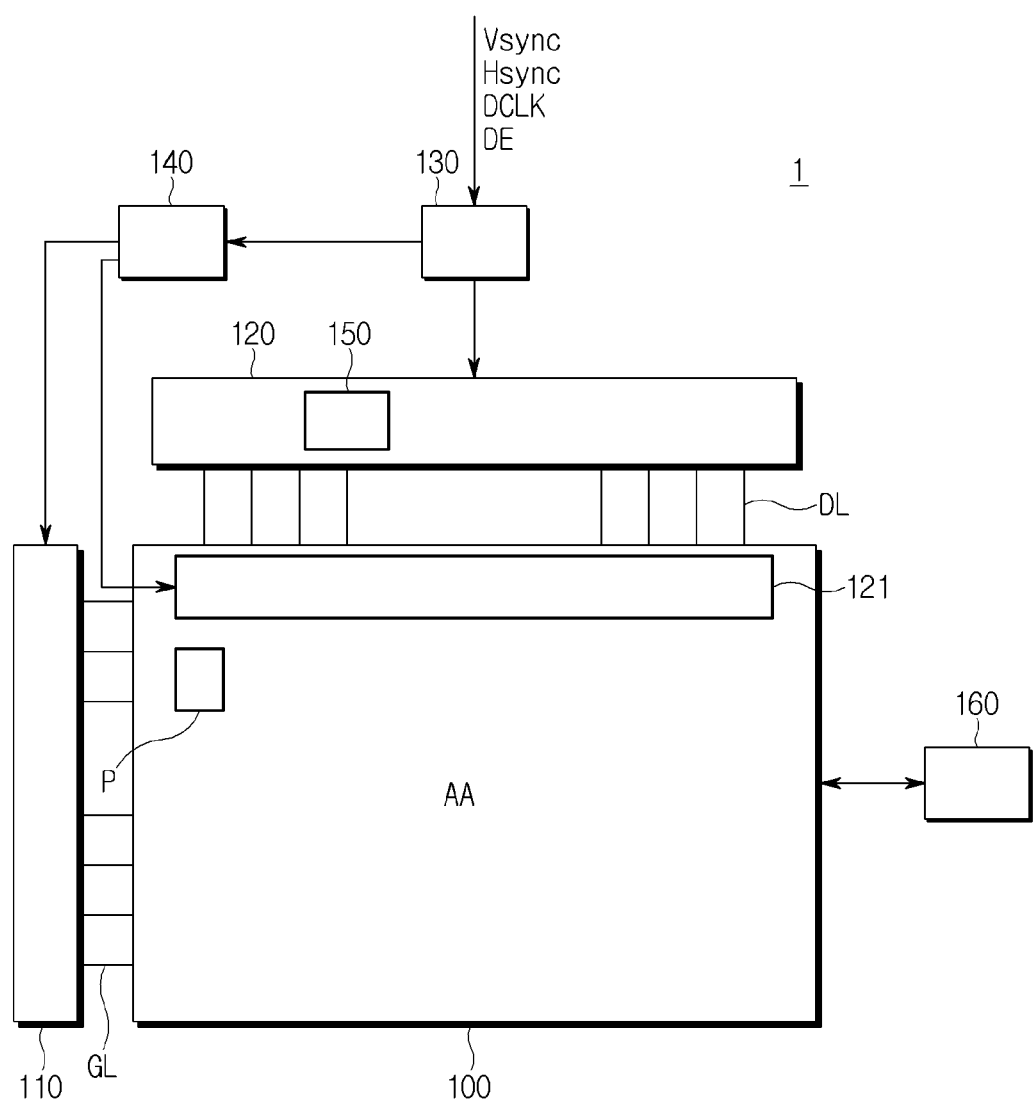
FIG. 1 is a block diagram showing a configuration of a display device according to an aspect of the present disclosure.

Other details of the aspects are included in the detailed description and drawings.

The features, advantages and method for accomplishment of the present disclosure will be more apparent from referring to the following detailed aspects described as well as the accompanying drawings. However, the present disclosure is not limited to the aspect to be disclosed below and is implemented in different and various forms. In the following description, when it is mentioned that a portion is "connected" to another portion, it includes not only "is directly connected" but also "electrically connected" with another element placed therebetween. Also, in the drawings, parts irrelevant to the present disclosure will be omitted for a clear description of the present disclosure. Similar reference numerals will be assigned to similar parts throughout this patent document.

FIG. 1 is a block diagram showing a configuration of a display device according to an aspect.

Referring to FIG. 1, the display device 1 includes a display panel 100 and a display panel driving circuit.

The display panel 100 includes a pixel array AA that displays pixel data of an input image. The pixel data of the input image is displayed on the pixels of the pixel array AA. The pixel array AA includes a plurality of data lines DL, a plurality of gate lines GL crossing the data lines DL, and pixels P arranged in a matrix form. The arrangement form of the pixels may include not only the matrix form but also a form in which pixels emitting the same color are shared, a stripe form, a diamond form, and the like.

When the resolution of the pixel array AA is n×m, the pixel array AA includes n pixel columns and m pixel rows crossing the pixel columns. The pixel column includes pixels arranged along a column direction. The pixel row includes pixels arranged along a row direction. The pixel row includes pixels arranged along an x-axis direction. One horizontal period is a time obtained by dividing one frame period by the total number of pixel lines. During one horizontal period, the pixel data is simultaneously written to the pixels of one pixel line.

Each of the pixels may include a red sub-pixel, a green sub-pixel, and a blue sub-pixel to implement color. Each of the pixels may further include a white sub-pixel. Each of the sub-pixels includes a pixel circuit. The pixel circuit includes a pixel electrode, a plurality of thin film transistors (TFTs), and a capacitor. The pixel circuit is connected to corresponding data lines DL and gate lines GL.

The display panel driving circuit generates and outputs drive signals for driving the display panel 100. The display panel driving circuit includes a gate driver 110, a data driver 120, and a timing controller 130 for controlling operation timings thereof. The display panel driving circuit writes data of the input image to pixels of the display panel 100 under the control of the timing controller 130.

The gate driver 110 applies a gate signal to the pixels P through the gate lines GL. The gate signal applied to the gate lines GL turns on switching TFTs provided in the sub-pixels, and pixel rows to be charged with a data voltage are sequentially selected.

In the aspect, the gate driver 110 may generate the gate signal based on a gate timing control signal received from a level shifter 140 provided in the display device 1. The level shifter 140 converts a logic high voltage (or a high potential input voltage) of an input signal received from the timing controller 130 into a gate high voltage, and converts a logic low voltage (or a low potential input voltage) of the input signal to a gate low voltage. The level shifter 140 may output clock signals swinging between the gate high voltage and the gate low voltage. An output signal of the level shifter 140 may be transmitted to at least one of a demultiplexer array 121 and the gate driver 110.

The gate driver 110 may sequentially shift the gate timing control signal output from the level shifter 140 and may sequentially output to the gate lines GL. The thus generated gate signal may be a pulse signal swinging between the gate high voltage and the gate low voltage.

In the aspect, the gate driver 110 may be implemented in the form of a gate-in-panel (GIP) disposed in a bezel area of the display panel 100.

The data driver 120 supplies the data voltage of the input image to the pixels P through the data lines DL. The data driver 120 converts the pixel data DATA of the input image received as a digital signal from the timing controller 130 into an analog gamma compensation voltage for each frame and outputs a data signal. The data driver 120 may generate a data signal by using a digital to analog converter (DAC) that converts a digital signal into the analog gamma compensation voltage. The data signal is supplied to the data lines DL.

The data driver 120 may be mounted on a chip on film (COF) in the form of a data drive IC (DIC) and may be connected between an external device and the display panel 100.

The display panel driving circuit may further include the demultiplexer array 121 disposed between the data driver 120 and the data lines DL.

The demultiplexer array 121 connects sequentially one channel of the data driver 120 to the plurality of data lines DL, and then distributes the data signal output from the one channel of the data driver 120 to the data lines DL in a time-division manner. As a result, the number of channels of the data driver 120 may be reduced.

The timing controller 130 receives the pixel data of the input image and a timing signal synchronized therewith from an external host system. The timing controller 130 transmits the pixel data of the input image to the data driver 120. The timing signal includes a vertical synchronization signal Vsync, a horizontal synchronization signal Hsync, a clock signal DCLK, a data-enable signal DE, etc.

The timing controller 130 may output a data timing control signal for controlling the data driver 120, a gate timing control signal for controlling the gate driver 110, and a MUX control signal for controlling switch elements of the demultiplexer array 121, on the basis of the timing signal received from the host system. The gate timing control signal may include a start pulse, a shift clock, and the like. The start pulse defines start timing of the gate driver 110 in every frame period. The shift clock defines shift timing of the gate signal output from the gate driver 110. The timing controller 130 may further output a control signal for controlling the level shifter 140.

The timing controller 130 is provided in the form of a flexible printed circuit board (FPCB) and may be connected to the COF on which the DIC is mounted. The timing controller 130 may be electrically connected to the DIC and the display panel 100 through wires formed on the COF. Other components such as the level shifter 140, etc., may be mounted together on the flexible printed circuit board on which the timing controller 130 is disposed.

In the aspect, the display device 1 may include a touch screen that detects a touch input that occurs on the display panel 100. In this aspect, the display device 1 may have an external type (on-cell type or add on type) in which a touch panel is provided separately from the display panel 100 or may have an internal type (in-cell type) in which a touch sensor is provided within the display panel 100.

When the display device 1 is implemented with an embedded touch screen, the display panel driving circuit may further include a touch driver 150 that is connected to the touch sensors through touch sensing lines to drive the touch sensors during a touch sensing period. The touch driver 150 may be integrally formed within the data driver 130 or formed independently. The touch driver 150 may apply a touch drive signal to the touch sensor during the touch sensing period and may detect a touch input based on a touch sensing signal sensed in response to the touch drive signal.

An example in which the display device 1 is implemented with a touch screen will be described below in more detail.

In the aspect, the display device 1 further includes a compensation signal generator 160. The compensation signal generator 160 generates a noise compensation signal for removing noise generated in the display device 1 and applies the noise compensation signal to the display panel 100 or the display panel driving circuit. The noise may be signal distortion and/or EMI noise generated by a drive signal applied to the display panel 100 or the display panel driving circuit. The drive signal may be, for example, the touch drive signal output from the touch driver 150 or the clock signal output from the level shifter 140.

In the aspect, the compensation signal generator 160 may remove a phase of a target signal by using a phase inversion signal of the target signal (e.g., noise signal) as the noise compensation signal in accordance with a phase cancellation method. In this aspect, if a delay occurs between the target signal and the phase inversion signal, the phase of the target signal is not completely canceled, and a differential signal remains between the target signal and the phase inversion signal, so that a phase cancellation efficiency may be degraded.

To solve this problem, the compensation signal generator 160 is configured to effectively cancel the target signal by generating a phase inversion signal with zero delay with respect to the target signal. Hereinafter, a specific structure of the compensation signal generator 160 will be described.

Figure 2:
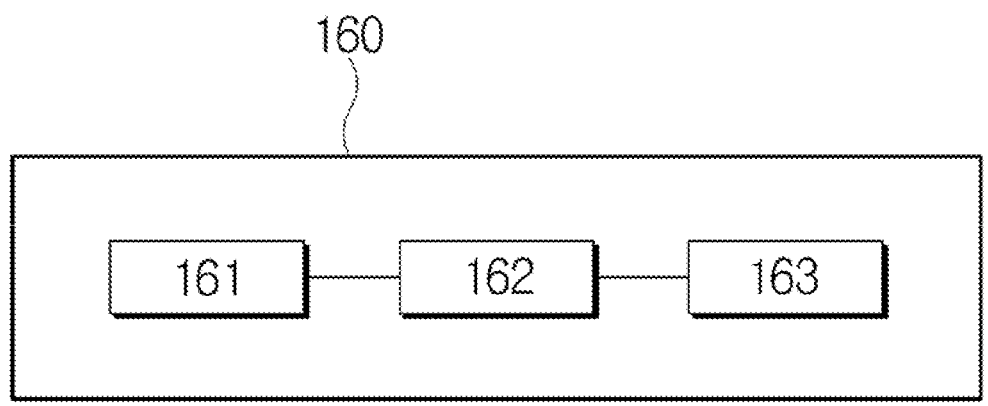
FIG. 2 is a block diagram showing a configuration of a compensation signal generator of the display device according to the aspect of the present disclosure.

FIG. 2 is a block diagram showing a configuration of the compensation signal generator of the display device according to the aspect.

Referring to FIGS. 1 and 2, the compensation signal generator 160 generates the noise compensation signal, and the generated noise compensation signal may be applied to the display panel 100 or to the display panel driving circuit. In the aspect, the noise compensation signal may refer to a signal for compensating for the effect caused by EMI noise generated by the drive signal applied to the display panel 100 from the data driver 120. The drive signal may be, for example, the touch drive signal output from the touch driver 150 or the clock signal output from the level shifter 140.

In the aspect, the compensation signal generator 160 includes a detection unit 161 that detects a phase shift signal to the target signal and an inversion unit 162 that inverts the detected phase shift signal.

In the aspect, the detection unit 161 may detect a phase shift signal generated by synthesizing two or more target signals. In the aspect, the two or more target signals include a first signal and a second signal, the first signal may be a noise signal sensed by the display panel 100 and the second signal may be a phase inversion signal of the sensed noise signal. In another aspect, the two or more target signals may be clock signals output from the level shifter 140.

The phase shift signal is a residual signal generated by synthesizing the target signals, and may include a time delay component between the target signals.

The inversion unit 162 generates the phase inversion signal by inverting the phase of the phase shift signal detected by the detection unit 161. To this end, the inversion unit 162 may include a phase inverting circuit, and the phase inverting circuit may include, for example, an inverter.

In the aspect, the compensation signal generator 160 may further include an amplification unit 163. The amplification unit 163 may amplify the phase inversion signal generated by the inversion unit 162. The amplification unit 163 may include an amplifier that amplifies the amplitude of a signal and may amplify the signal to have a predetermined gain.

The phase inversion signal generated by the inversion unit 162 or the phase inversion signal amplified by the amplification unit 163 is synthesized with at least one of the target signals to generate a noise compensation signal, so that the phase of the target signal may be canceled.

Hereinafter, a specific circuit configuration of the compensation signal generator 160 and a compensation method through the same will be described.

Figure 3:
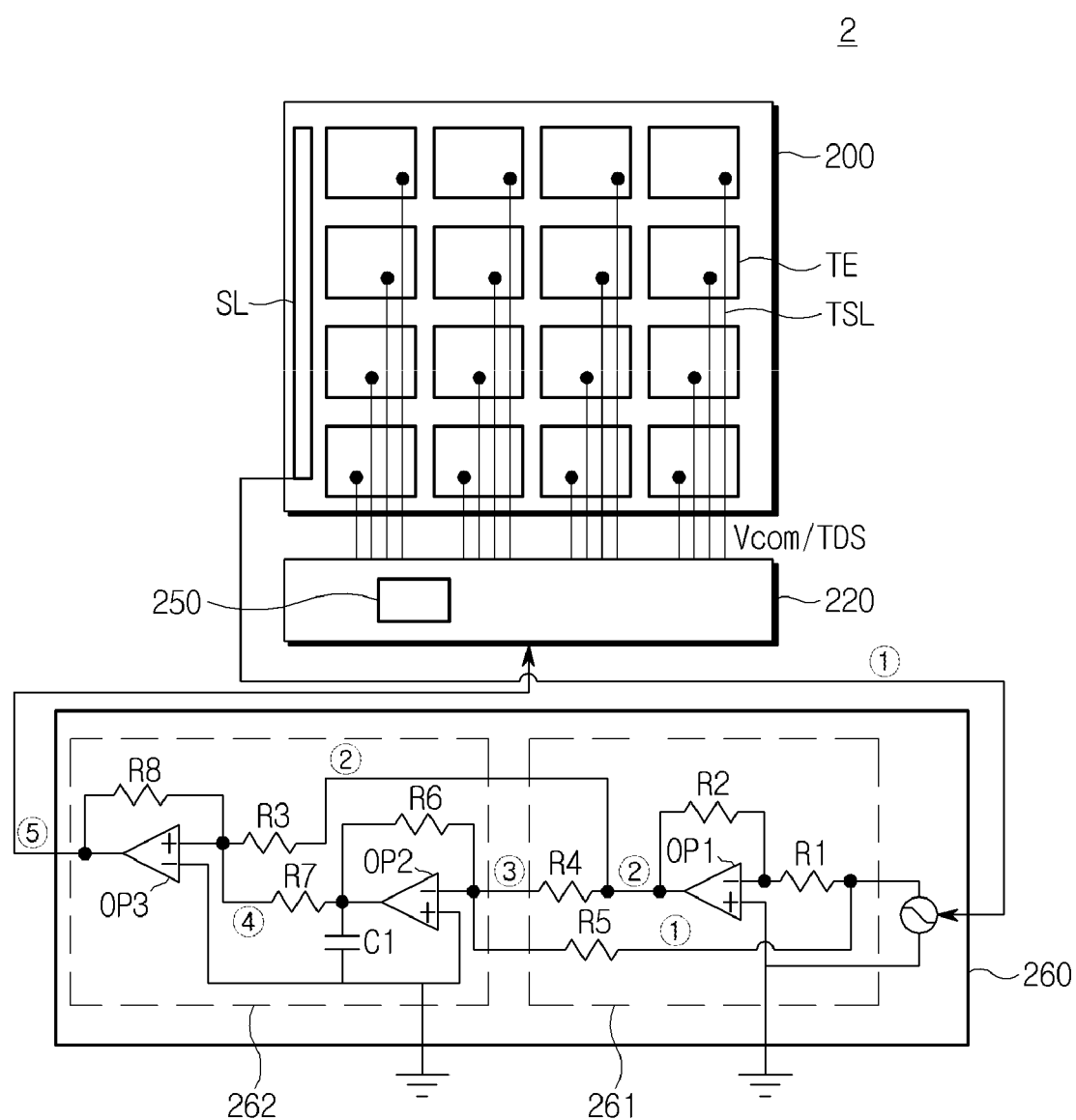
FIG. 3 is a view showing a circuit configuration of the compensation signal generator according to the aspect of the present disclosure.
Figure 4:
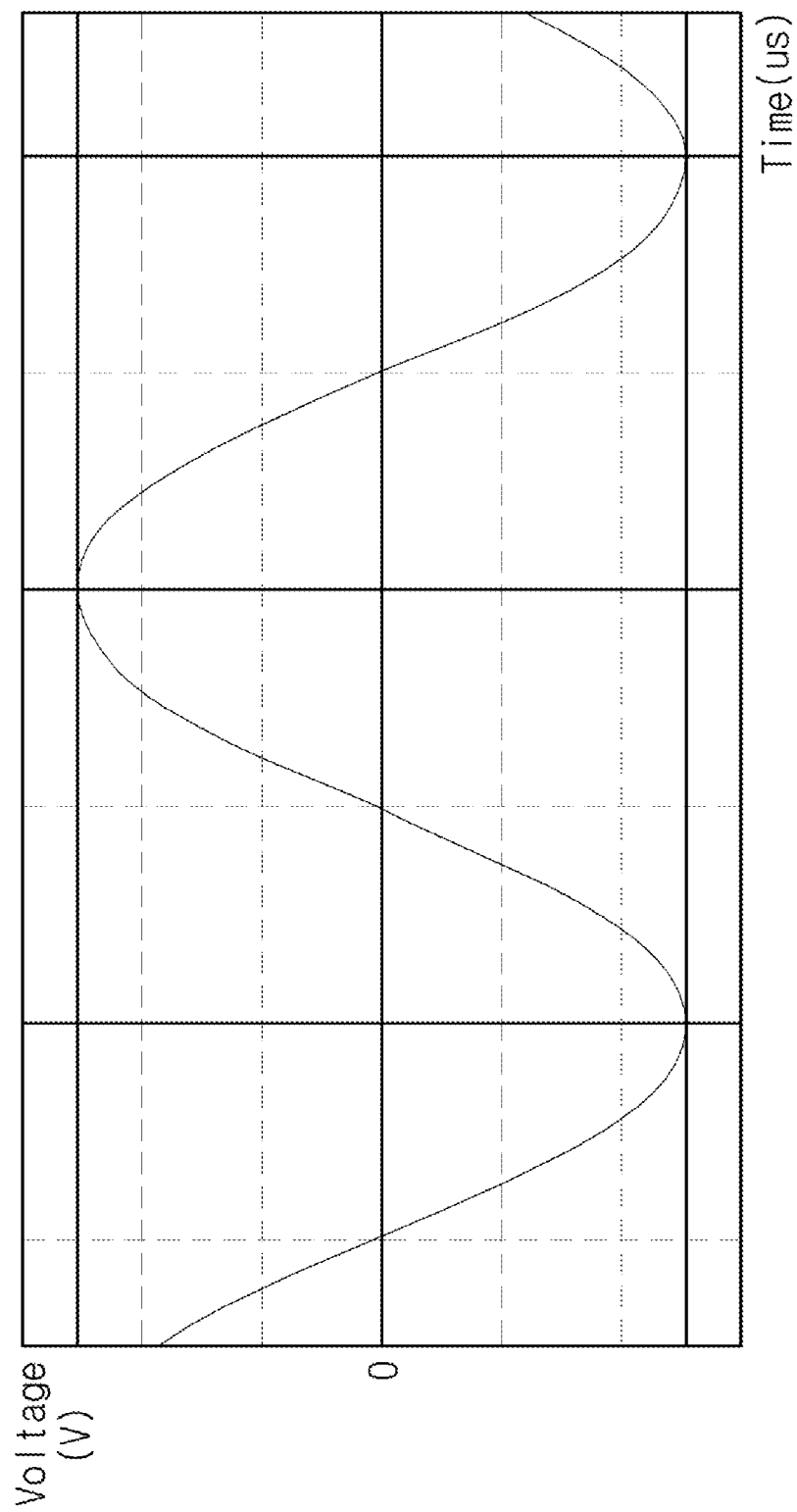
FIG. 4 is a view showing a waveform of a noise signal shown in FIG. 3 according to the aspect of the present disclosure.

FIG. 3 is a view showing a circuit configuration of the compensation signal generator according to the aspect. FIGS. 4 to 9 show waveforms of signals generated by the compensation signal generator shown in FIG. 3 according to the aspect.

Referring to FIG. 3, a display device 2 according to the aspect may be implemented with an embedded touch screen. In the aspect, a display panel 200 may include a plurality of touch electrodes TE. The touch electrodes TE may be connected to a data driver 220 and/or a touch driver 250 through a touch sensing line TSL.

In the aspect, the touch electrodes TE may be formed by blocking (grouping) electrodes of pixels to a predetermined size. That is, the touch electrodes TE may be for touch sensing and for display driving. Accordingly, the touch electrodes TE may receive a common voltage Vcom to display image data during a display period and may receive a touch drive signal TDS to form capacitances during the touch sensing period.

The drive signal (e.g., the touch drive signal TDS) applied to the touch electrode TE may be a pulse signal that swings between a high voltage and a low voltage. When the drive signal is a pulse signal, the drive signal may have various signal waveforms such as a sinusoidal wave, a triangular wave, or a square wave.

As the pulse type drive signal is sequentially applied to the plurality of touch electrodes TE, EMI noise may be generated in the display panel 200. To solve this problem, a compensation signal generator 260 provides a noise compensation signal corresponding to an EMI noise signal to the display panel 200, so that an EMI level is effectively improved.

In the aspect, the compensation signal generator 260 includes a detection unit 261 and an inversion unit 262.

The detection unit 261 may sense a noise signal ① generated by the display panel 200 as a first signal of the target signal. For example, the detection unit 261 may receive the noise signal ① generated by the display panel 200 through a sensing line SL electrically connected to at least one area of the display panel 100. The noise signal ① detected through the sensing line SL may be a sinusoidal wave shown in FIG. 4.

Figure 5:
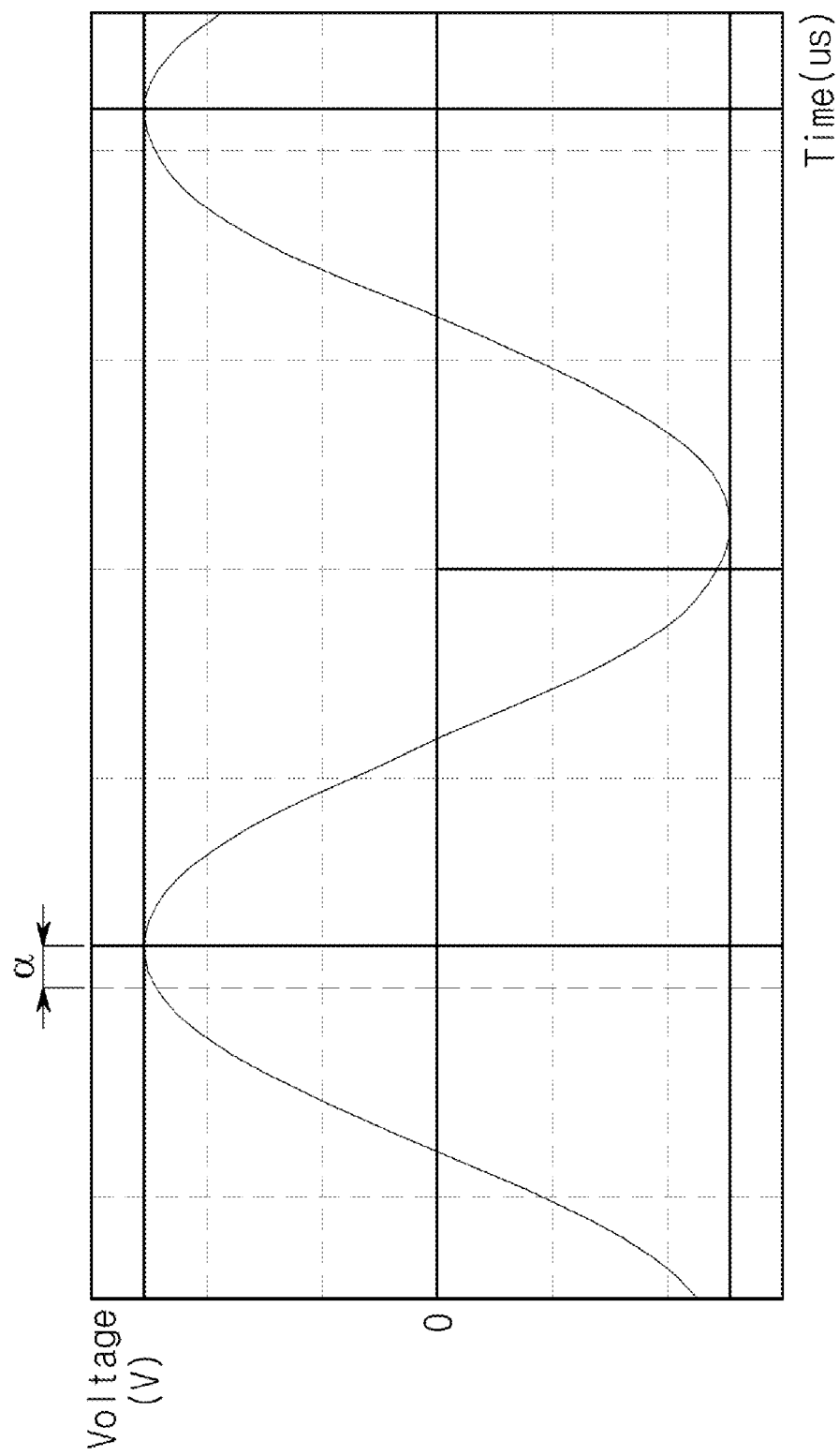
FIG. 5 is a waveform diagram showing a first phase inversion signal shown in FIG. 3 according to the aspect of the present disclosure.
Figure 6:
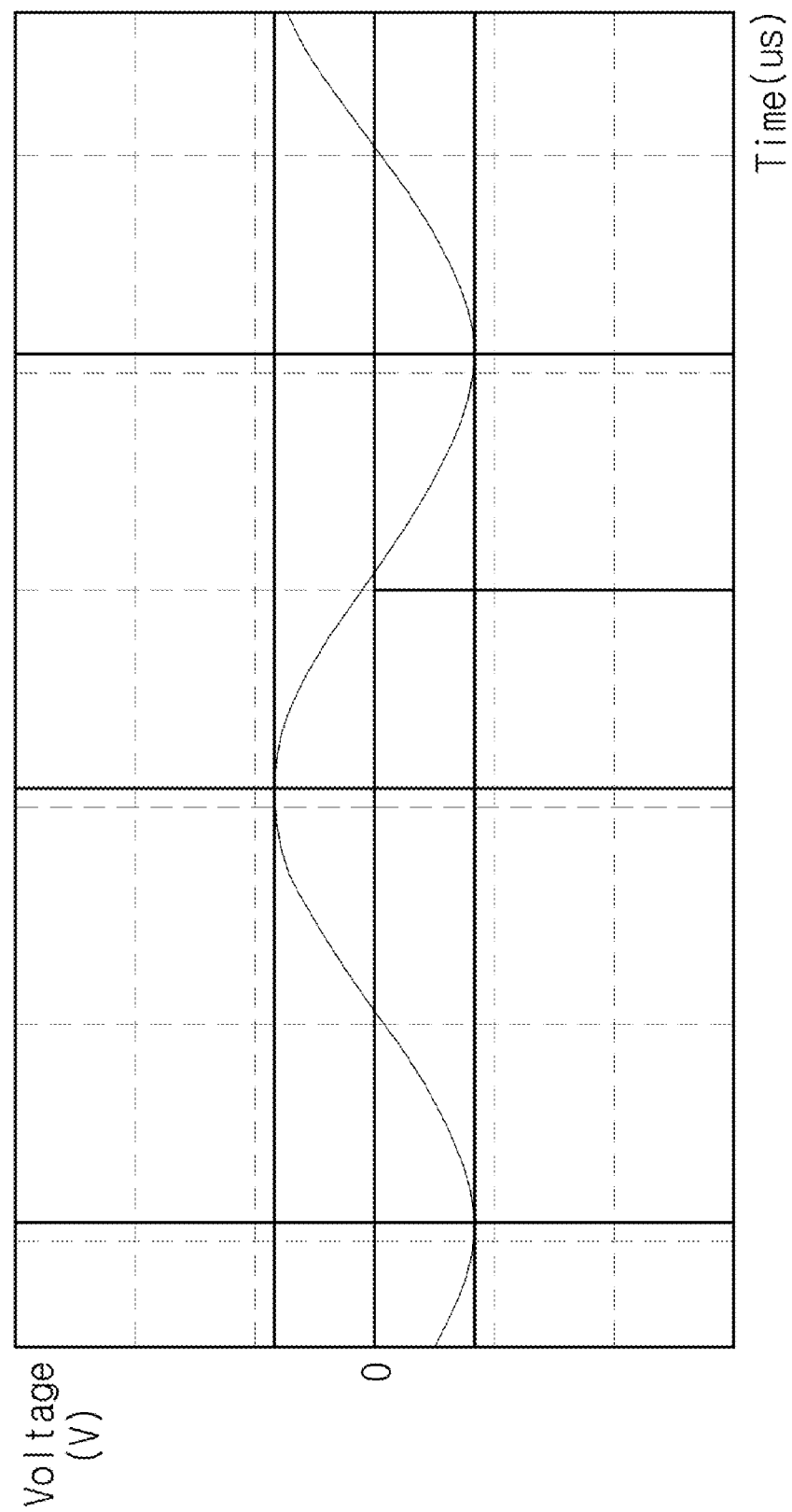
FIG. 6 is a waveform diagram showing a phase shift signal shown in FIG. 3 according to the aspect of the present disclosure.

The detection unit 261 may invert a phase of the sensed noise signal ① to generate a first phase inversion signal ② shown in FIG. 5 as a second signal of the target signal. For example, the detection unit 261 includes an inverter as a phase inverting circuit and may generate the first phase inversion signal ② which has the same frequency and the same amplitude as the noise signal ① and has an upside-down inverted phase with respect to the noise signal ①. Specifically, the noise signal ① is input to an inverting terminal (-) of a first inverting amplifier OP1 constituting the inverter, and then the first phase inversion signal ② obtained by inverting the phase of the noise signal ① by 180° is output to an output terminal of the first inverting amplifier OP1.

Here, the first phase inversion signal may have a phase shift component as much as a with respect to an ideal phase inversion signal of the noise signal due to a delay occurring in actual signal processing.

The target signals detected by the detection unit 261 may be synthesized. That is, the first phase inversion signal ② may be synthesized with the noise signal ①. Specifically, the phase inversion signal ② output from the first inverting amplifier OP1 is synthesized with the noise signal ① applied to the output terminal of the first inverting amplifier OP1.

In an ideal case, when the noise signal ① and the first phase inversion signal ② are synthesized, the noise signal ① can be completely canceled. However, as described above, since the first phase inversion signal ② has a time delay, a residual signal ③ shown in FIG. 6 remains. Such a residual signal is a phase shift signal in which a phase delay of the first phase inversion signal ② is reflected. The residual signal may have a sinusoidal wave.

The detection unit 261 may output a phase shift signal ③ according to the synthesis of the noise signal ① and the first phase inversion signal ②.

Figure 7:
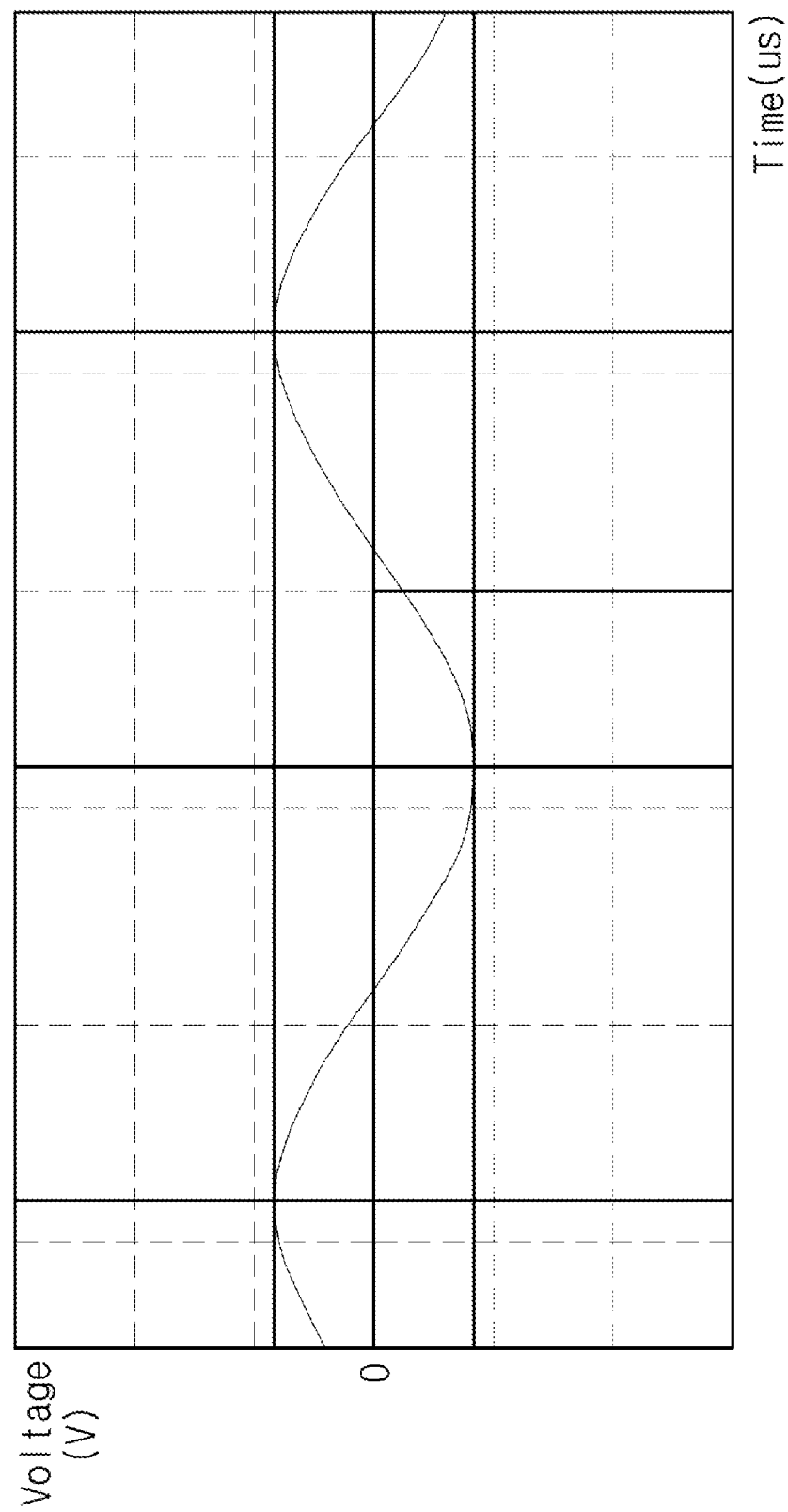
FIG. 7 is a waveform diagram showing a second phase inversion signal shown in FIG. 3 according to the aspect of the present disclosure.

The inversion unit 262 inverts a phase of the phase shift signal ③ output from the detection unit 261 and generates a second phase inversion signal ④ shown in FIG. 7. For example, the inversion unit 262 includes an inverter as a phase inverting circuit and may generate a second phase inversion signal ④ which has the same waveform as the phase shift signal ③ and has an upside-down inverted phase with respect to the phase shift signal ③. Specifically, the phase shift signal ③ is input to an inverting terminal (-) of a second inverting amplifier OP2 constituting the inverter, and then the second phase inversion signal ④ obtained by inverting the phase of the phase shift signal ③ by 180° is output to an output terminal of the second inverting amplifier OP2.

In the aspect, the compensation signal generator 260 may further include an amplifier (not shown) for amplifying or attenuating the phase of the second phase inversion signal ④ output from the inversion unit 262.

The second phase inversion signal ④ output from the inversion unit 262 may be synthesized with the first phase inversion signal ②. Specifically, the second phase inversion signal ④ output from the second inverting amplifier OP2 is synthesized with the first phase inversion signal ② output from the first inverting amplifier OP1 to an output terminal of the second inverting amplifier OP2.

Figure 8:
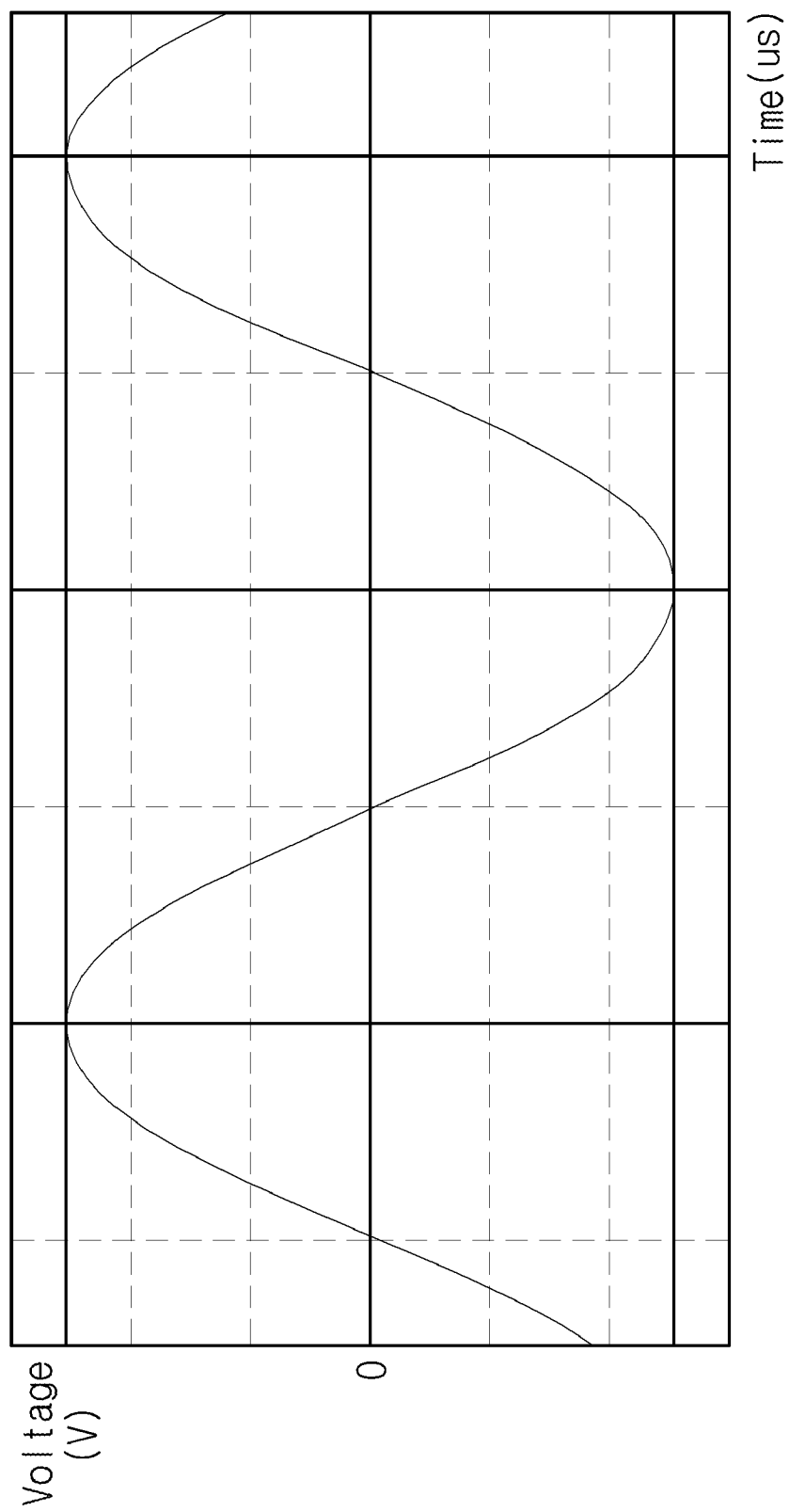
FIG. 8 is a waveform diagram showing a noise compensation signal shown in FIG. 3 according to the aspect of the present disclosure.

The signal obtained by synthesizing the second phase inversion signal ④ and the first phase inversion signal ② has a waveform of the phase inversion signal having no phase delay (zero delay) with respect to the noise signal ① as shown in FIG. 8. That is, the synthesized signal of the second phase inversion signal ④ and the first phase inversion signal ② has a shape of an ideal phase inversion signal which has the same frequency and the same amplitude as the noise signal ① and has an upside-down inverted phase with respect to the noise signal ①.

In the aspect, the compensation signal generator 260 may further include an amplifier OP3 for amplifying or attenuating the phase of the second phase inversion signal ④. The second phase inversion signal ④ is input to a non-inverting terminal of the amplifier OP3, is amplified or attenuated as much as a defined gain by the amplifier OP3, and then is output. The compensation signal generator 260 outputs the synthesized signal ⑤ of the first phase inversion signal ② and the second phase inversion signal ④ to the display panel 200 as a noise compensation signal. Specifically, the second phase inversion signal ④ output from the second inverting amplifier OP2 or the amplifier OP3 is synthesized with the first phase inversion signal ② which is output from the first inverting amplifier OP1 to the output terminal of the second inverting amplifier OP2 or the amplifier OP3. In the aspect, the compensation signal generator 260 may output the noise compensation signal ⑤ to the display panel 200 through the data driver 220.

Figure 9:
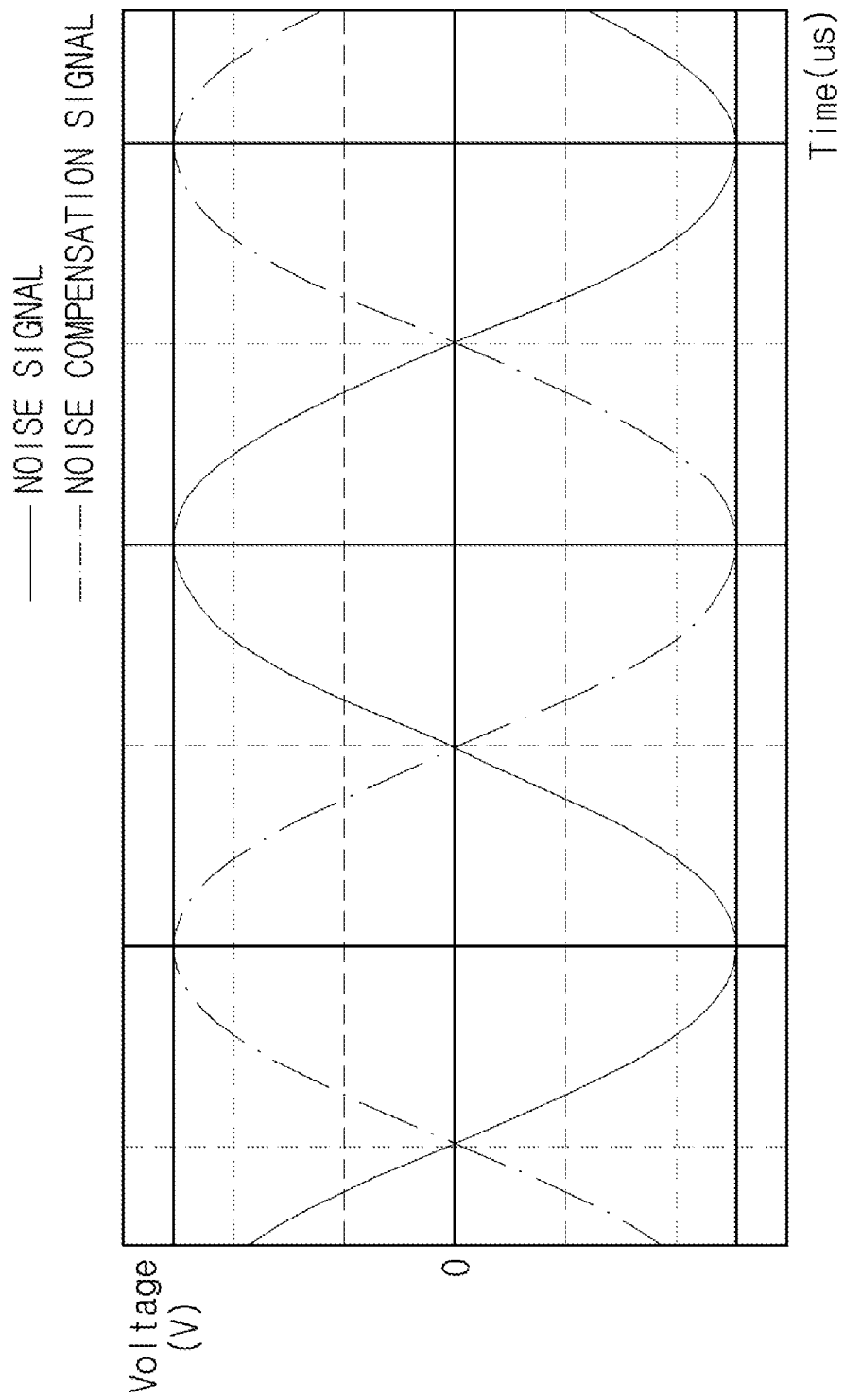
FIG. 9 is a waveform diagram showing a noise signal and the noise compensation signal shown in FIG. 3 according to the aspect of the present disclosure.

As shown in FIG. 9, the thus generated noise compensation signal ⑤ is a phase inversion signal close to zero delay with respect to the noise signal ①. When the noise compensation signal ⑤ is output to the display panel 200, the noise signal ① of the display panel 200 generated by EMI and the like is synthesized with the noise compensation signal ⑤, so that the phase may be effectively canceled. As a result, through the compensation signal generator 260, the display device 2 according to the aspect may effectively attenuate the noise caused by EMI or the like.

Figure 10:
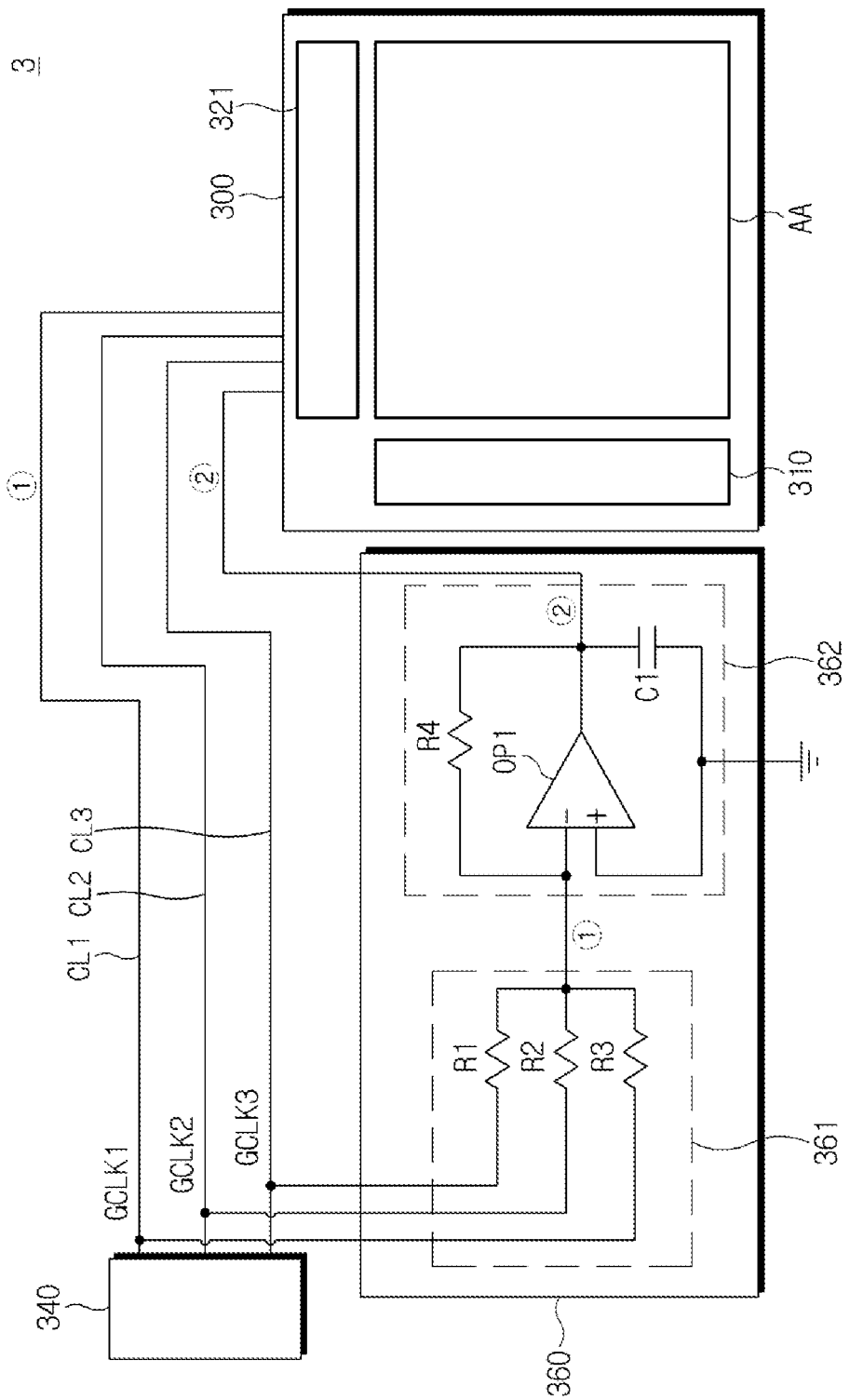
FIG. 10 is a view showing a circuit configuration of a compensation signal generator according to another aspect of the present disclosure.

FIG. 10 is a view showing a circuit configuration of a compensation signal generator according to another aspect. FIGS. 11 to 14 show waveforms of signals generated by the compensation signal generator shown in FIG. 10 according to the aspect.

Referring to FIG. 10, a display device 3 according to the aspect may include a level shifter 340. The level shifter 340 may be provided as an independent component. However, the level shifter 340 may be one of components of a gate driver 310 in another aspect.

Figure 11:
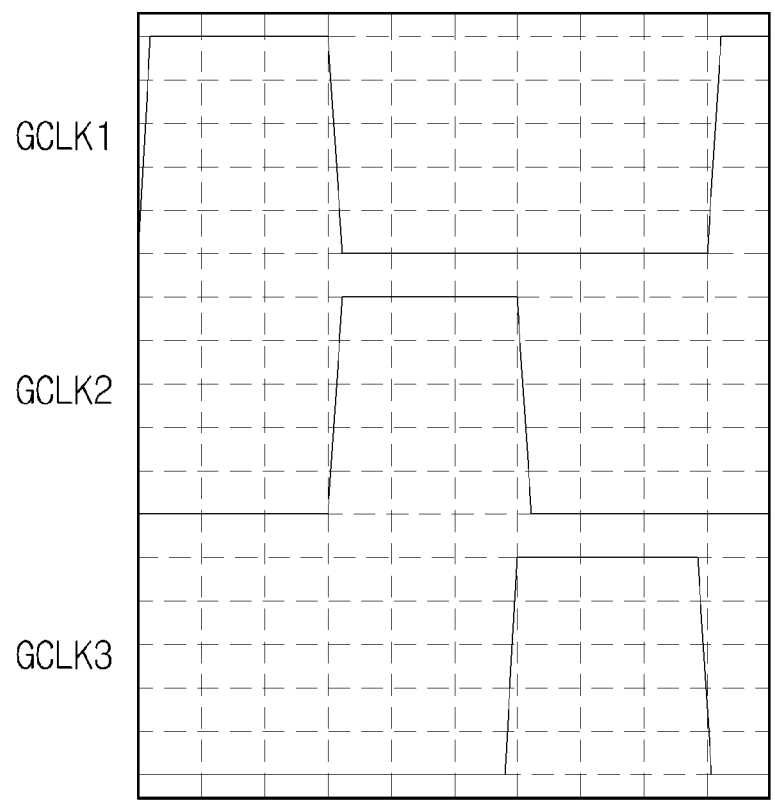
FIG. 11 is a waveform diagram showing clock signals shown in FIG. 10 according to the another aspect of the present disclosure.
Figure 12:
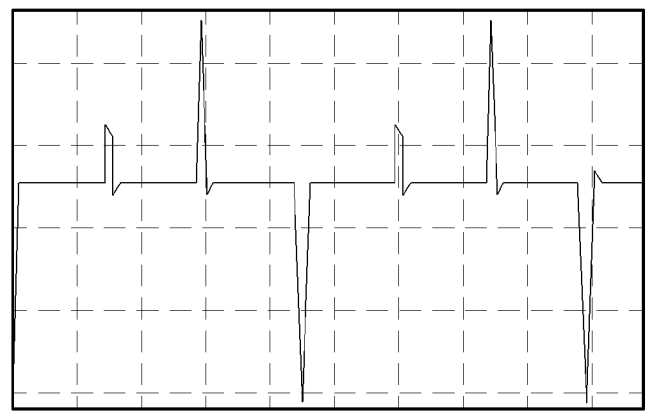
FIG. 12 is a waveform diagram showing a phase shift signal shown in FIG. 10 according to the another aspect of the present disclosure.

The level shifter 340 may output gate clock signals GCLK1 to GCLK3 based on the gate timing control signal received from the timing controller 130 shown in FIG. 1. The gate clock signals GCLK1 to GCLK3 may be, for example, a pulse signal which outputs a gate high voltage (or gate low voltage) pulse at a timing indicated by the gate timing control signal. For example, as shown in FIG. 11, the gate clock signals GCLK1 to GCLK3 may be three 3-phase gate clock signals GCLK1 to GCLK3 which have the same pulse width and have a phase delayed by ⅓ cycle. However, the aspect is not limited thereto. For example, the gate clock signals may be the n number of pulse signals which have the same pulse width and have a phase delayed by 1/n cycle (n is a natural number). However, the aspect is not limited thereto.

The level shifter 340 may sequentially output the gate clock signals GCLK1 to GCLK3 to clock lines CL1 to CL3. The gate clock signals GCLK1 to GCLK3 output from the level shifter 340 may be transmitted to a demultiplexer array 321 and/or a shift register of the gate driver 310.

As the pulse type gate clock signals GCLK1 to GCLK3 are sequentially applied to the clock lines CL1 to CL3, EMI noise may occur. Then, a smooth output state of the level shifter 340 cannot be guaranteed, and reliability of the gate clock signals GCLK1 to GCLK3 may be reduced.

To remove the noise, a method of canceling the noise phase by overlapping with a rising edge and a falling edge of the adjacent gate clock signals GCLK1 to GCLK3 may be used. For example, the second gate clock signal GCLK2 may rise in synchronization with the falling edge of the first gate clock signal GCLK1, and the third gate clock signal GCLK3 may rise in synchronization with the falling edge of the second gate clock signal GCLK2. Then, electromagnetic wave cancellation occurs between the adjacent gate clock signals GCLK1 to GCLK3, so that the noise problem may be overcome or compensated.

In an ideal case, the rising edge and the falling edge between adjacent gate clock signals GCLK1 to GCLK3 may be completely synchronized. However, a signal delay may occur in an actual operating environment. That is, the rising edge and the falling edge between the adjacent gate clock signals GCLK1 to GCLK3 may be delayed or advanced with respect to each other with a random time. Accordingly, when desynchronization occurs between the rising edge and the falling edge of the adjacent gate clock signals GCLK1 to GCLK3, the noise is not completely canceled, and a residual signal shown in FIG. 12 remains. Such a residual signal is a phase shift signal in which a phase delay between the gate clock signals GCLK1 to GCLK3 is reflected. Such a phase shift signal may be applied to a display panel 300 as a noise signal.

A compensation signal generator 360 provides, to the display panel 300, a noise compensation signal corresponding to the noise signal generated between the gate clock signals GCLK1 to GCLK3, so that the EMI level is effectively improved.

In the aspect, the compensation signal generator 360 includes a detection unit 361 and an inversion unit 362.

The detection unit 361 may detect a noise signal ① generated by the gate clock signals GCLK1 to GCLK3. For example, the detection unit 361 may be connected to the clock lines CL1 to CL3, may synthesize the gate clock signals GCLK1 to GCLK3 output through the clock lines CL1 to CL3 as target signals, and may detect a phase shift signal ① shown in FIG. 12.

Figure 13:
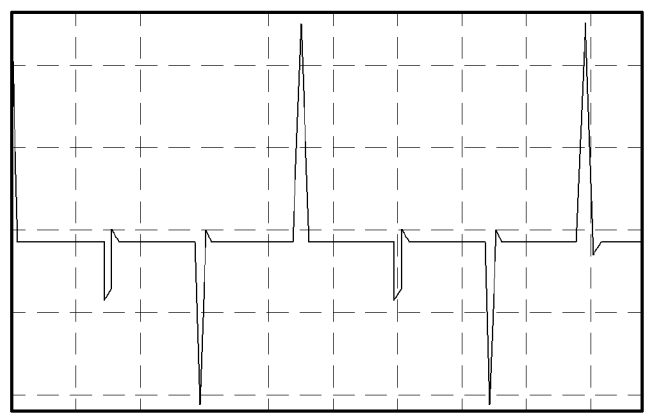
FIG. 13 is a waveform diagram showing a phase inversion signal shown in FIG. 10 according to the another aspect of the present disclosure.

The inversion unit 362 inverts the phase of the phase shift signal ① output from the detection unit 361 and generates a phase inversion signal ② shown in FIG. 13. For example, the inversion unit 362 includes an inverter as a phase inverting circuit and may generate a phase inversion signal which has the same waveform as the phase shift signal and has an upside-down inverted phase with respect to the phase shift signal. Specifically, the phase shift signal ① is input to an inverting terminal (-) of an inverting amplifier OP1 constituting the inverter, and then the phase inversion signal ② obtained by inverting the phase of the phase shift signal ① by 180° is output to an output terminal of the inverting amplifier OP1.

The compensation signal generator 360 outputs the phase inversion signal ② generated by the inversion unit 362 to the display panel 300 as a noise compensation signal. For example, the compensation signal generator 360 may output the noise compensation signal ② to the display panel 300 through the gate driver 310 or the demultiplexer array 321.

Figure 14:
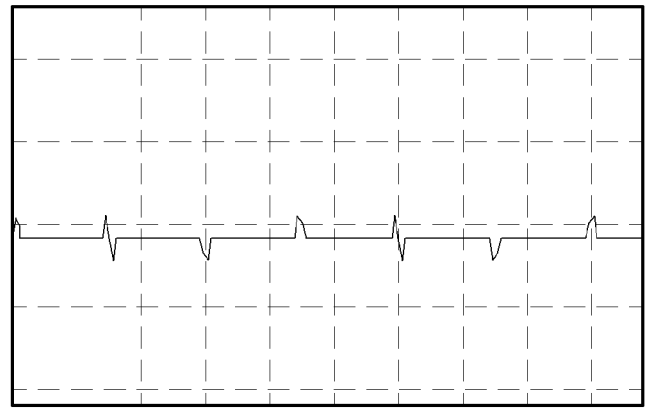
FIG. 14 is a waveform diagram showing a noise signal and a noise compensation signal shown in FIG. 10 according to the another aspect of the present disclosure.

The noise compensation signal ② provided to the display panel 300 is synthesized with the noise signal ① applied to the display panel 300 by the level shifter 340, so that the noise signal ① may be effectively canceled as shown in FIG. 14. As a result, through the compensation signal generator 360, the display device 3 according to the aspect may effectively attenuate the noise caused by EMI or the like.

Figure 15:
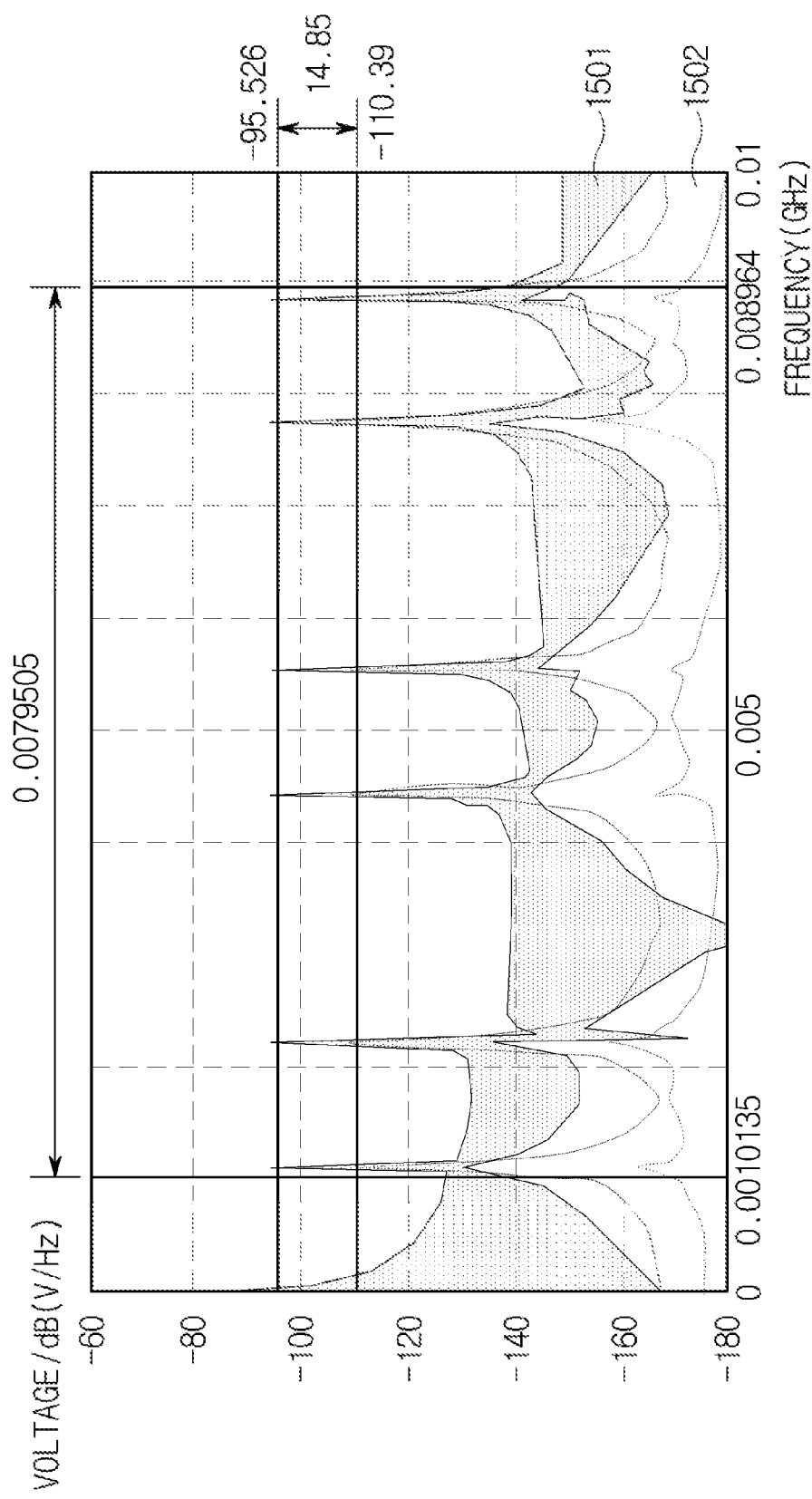
FIGS. 15 and 16 are graphs showing noise improvement effect according to the aspect shown in FIG. 10.
Figure 16:
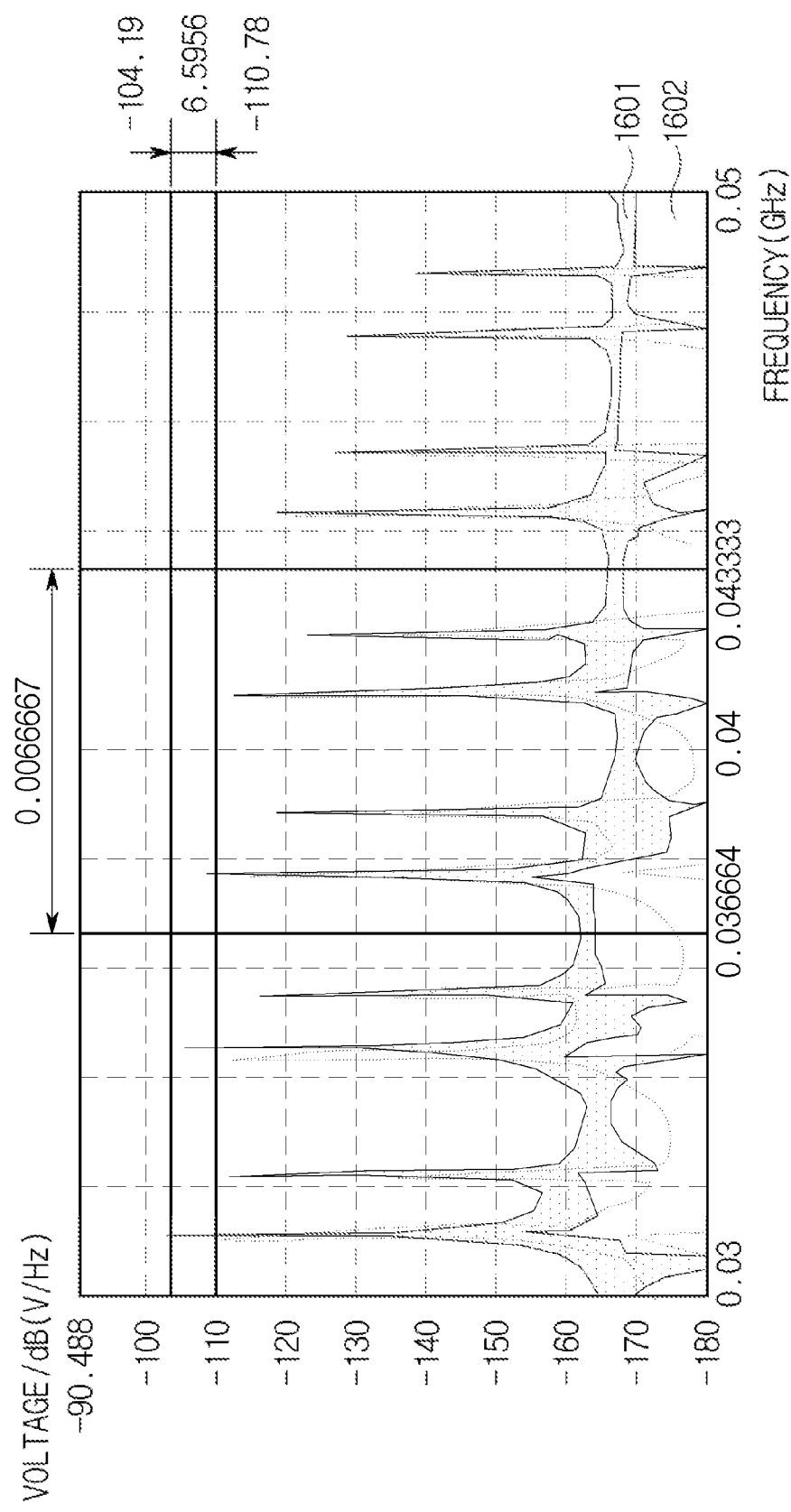

FIGS. 15 and 16 are graphs showing noise improvement effect according to the aspect shown in FIG. 10.

FIG. 15 shows the noise improvement effect at low frequencies.

Referring to FIG. 15, in a phase cancellation method 1501 which simply synthesizes the phase inversion signal with the noise signal without considering the delay of the phase inversion signal, an average peak noise is about −95.526 V/Hz.

On the other hand, according to the above-described aspects, in a method 1502 which detects a phase delay signal from a target signal and uses an inversion signal of the phase delay signal as a noise compensation signal, the average peak noise is about −110.39 V/Hz. Therefore, the aspects show an EMI improvement effect of about 15 dB.

FIG. 16 shows the noise improvement effect at high frequencies.

Referring to FIG. 16, in a phase cancellation method 1601 that does not consider a delay of the phase inversion signal, the average peak noise is about −104.19 V/Hz.

On the other hand, according to the above-described aspects, in a method 1602 which detects a phase delay signal from a target signal and uses an inversion signal of the phase delay signal as a noise compensation signal, the average peak noise is about −110. 78 V/Hz. Therefore, the aspects show an EMI improvement effect of about 2 to 5 dB.

The above-described aspects may increase the noise improvement effect even in a high frequency region of 10 MHz or higher.

It may be understood by those skilled in the art that the present disclosure may be embodied in other specific forms without departing from its spirit or essential characteristics. Therefore, the foregoing aspects and advantages are merely exemplary and are not to be construed as limiting the present disclosure. The scopes of the present disclosure are described by the scopes of the following claims rather than by the foregoing description. All modification, alternatives, and variations derived from the scope and the meaning of the scope of the claims and equivalents of the claims should be construed as being included in the scopes of the aspects.

The display device according to the present disclosure may effectively attenuate noise caused by EMI or the like by using the phase inversion signal having zero delay with respect to target signals as a noise compensation signal.

The display device according to the present disclosure effectively removes noise generated by the display panel, so that the resolution of the display device may be increased and reliability of the system may be improved.

The display device according to the present disclosure can increase the noise improvement effect in a high frequency region of 10 MHz or higher.

It will be apparent to those skilled in the art that various modifications and variations can be made in the display device of the present disclosure without departing from the spirit or scope of the aspects. Thus, it is intended that the present disclosure covers the modifications and variations of the aspects provided they come within the scope of the appended claims and their equivalents.

What is claimed is:

1. A display device comprising:
   a display panel including pixels displaying images;
   a display panel driving circuit outputting a drive signal for driving the display panel;
   a compensation signal generator sensing a noise signal generated by the display panel or the display panel driving circuit and generating a noise compensation signal corresponding to the noise signal; and
   a level shifter which sequentially outputs a plurality of clock signals to clock lines,
   wherein the compensation signal generator comprises:
      a detection unit detecting a phase shift signal generated by synthesizing the plurality of clock signals; and
      an inversion unit generating a phase inversion signal by inverting a phase of the phase shift signal.

2. The display device of claim 1, wherein the target signal comprises:
   a first signal sensed by the display panel through a sensing line; and
   a second signal generated by inverting a phase of the first signal,
   wherein the detection unit detects the phase shift signal generated by synthesizing the first signal and the second signal, and
   wherein the second signal has a phase shift component with respect to a phase inversion signal of the noise signal.

3. The display device of claim 2, wherein the phase inversion signal output from the inversion unit is synthesized with the second signal to generate the noise compensation signal, and the noise compensation signal is provided to the display panel.

4. The display device of claim 3, wherein the noise compensation signal has a same frequency and a same amplitude as the first signal and has an upside-down inverted phase with respect to the first signal.

5. The display device of claim 3, wherein the compensation signal generator further comprises an amplification unit which amplifies or attenuates the phase shift signal output from the inversion unit.

6. The display device of claim 3, wherein the display panel comprises touch electrodes for detecting a touch input, and
   wherein the display panel driving circuit applies a common voltage to the touch electrode during a display period, and applies a touch drive signal to the touch electrode during a touch sensing period.

7. The display device of claim 6, wherein the first signal is an electromagnetic interference (EMI) noise signal which is sensed from the display panel when the touch drive signal of pulse-shaped is applied to the touch electrodes.

8. The display device of claim 1, wherein the phase inversion signal output from the inversion unit is provided to the display panel as the noise compensation signal, and is synthesized with the noise signal generated by the plurality of clock signals, so that a phase of the noise signal is canceled.

9. The display device of claim 8, wherein the plurality of clock signals are n number of pulse signals having a same pulse width and a phase delayed by 1/n cycle.

10. The display device of claim 9, wherein a rising edge and a falling edge between adjacent clock signals among the plurality of clock signals are delayed or advanced with respect to each other with a random time.

11. The display device of claim 8, wherein the display panel driving circuit comprises:
a gate driver applying a gate signal to the pixels through gate lines;
a data driver applying a data signal to the pixels through data lines; and
a demultiplexer array disposed between the data driver and the data lines, and
wherein the clock signals are provided to at least one of the gate driver and the demultiplexer array.

12. A display device comprising:
a display panel on which pixels are disposed;
a level shifter sequentially outputting a plurality of clock signals to clock lines;
a gate driver generating a gate signal based on the plurality of clock signals and applying the gate signal to the pixels through gate lines;
a data driver applying a data signal to the pixels through data lines; and
a compensation signal generator sensing a noise signal generated by the level shifter and generating a noise compensation signal corresponding to the noise signal, wherein the compensation signal generator comprises:
a detection unit detecting a phase shift signal generated by synthesizing the plurality of clock signals; and
an inversion unit generating a phase inversion signal by inverting a phase of the phase shift signal.

13. The display device of claim 12, wherein the plurality of clock signals are n number of pulse signals having a same pulse width and a phase delayed by 1/n cycle.

14. The display device of claim 13, wherein a rising edge and a falling edge between adjacent clock signals among the plurality of clock signals are delayed or advanced with respect to each other with a random time.

* * * * *